United States Patent Office 3,274,165
Patented Sept. 20, 1966

3,274,165
METHOD FOR PREPARING LINEAR POLY-
ARYLENE SULFIDE
Robert W. Lenz, Dedham, Mass., and Carl E. Handlovits
and William K. Carrington, Midland, Mich., assignors
to The Dow Chemical Company, Midland, Mich., a
corporation of Delaware
No Drawing. Filed May 10, 1965, Ser. No. 454,644
10 Claims. (Cl. 260—79)

The present application is a continuation-in-part of applicants' copending application Serial No. 85,209, filed January 27, 1961, and now abandoned.

The present invention relates to a new and useful method for making linear polyarylene sulfides. More particularly the present invention concerns a process employing a single aromatic compound which homopolymerizes to yield the linear polyarylene sulfides separable from any coproduct.

Polyphenylene sulfides have been prepared by Macallum by the process described in U.S. Patents Nos. 2,538,941 and 2,513,188. The process of Macallum, while offering promise as a convenient route to phenylene sulfide polymers from inexpensive, readily available monomers, has exhibited several difficulties when scaled up to commercial production which offset the promising aspects of the process. The Macallum process has the disadvantage that it is hard to duplicate and control and produces crosslinked and branched polymers. Therefore, it would be desirable to have a process which provides linear polyarylene sulfides and which polymer overcomes the disadvantages attendant in the Macallum polymer.

It is therefore an object of the present invention to provide a process for the preparation of linear polyarylene sulfides. Another object is to provide a process for the production of polyarylene sulfides which can be controlled to achieve reproducible results. A still further object is to provide a process for producing substantially linear polyarylene sulfides. These and other objects will become apparent to those skilled in the art to which the invention pertains from the following specification and claims.

It has now been found that linear polyarylene sulfide polymers can be prepared by homopolymerizing a metal salt of a bromo or iodothiophenol (metal bromothiophenoxide or metal iodothiophenoxide). The polymerization technique can be either bulk (mass) polymerization at a temperature below the melting point of the salt or solution polymerization, i.e., in the presence of a solvent substantially inert under the conditions of reaction. When polymerizing by the solution technique, the reaction temperature does not have to be below the melting point of the salt. A much wider range of reaction temperature can be used, both below and above the melting point of the salt, in solution polymerizations. In either event, the polymerization is preferably carried out under an inert atmosphere, and for a period of time to complete the polymerization to the desired degree. Thus, one can carry out the polymerization of the metal salt for from 1 to 144 hours depending upon the particular salt, the temperature of reaction, the use of solvents, etc. It is to be understood that when employing the solution polymerization technique greater freedom of reaction conditions can be obtained. Thus, for example, the temperature of reaction can be varied from well below the melting point of the salt to well above the melting point with attendant reduction and/or increase in reaction time and/or in pressure from atmospheric pressure to maintain the reaction mass (monomer and solvent) in the liquid state. Good results are obtained in either case, bulk or solution polymerization techniques, when the monomer, i.e., metal salt or bromo or iodothiophenol, is of a purity above about 90 percent and preferably above 95 percent. While reactants of lesser purity will produce some of the desired product, chain length and yield of linear polymer are somewhat reduced.

The monomer employed in accordance with the present invention is a metal salt of a halothiophenol (metal halothiophenoxide) having the general formula:

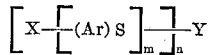

wherein X represents a halogen atom having an atomic number from 35 to 53, inclusive, which can be in a position meta or para to the sulfur on the Ar nucleus, Ar represents a divalent aromatic hydrocarbon radical, Y represents a metal ion, $n$ represents an integer equal to the valence of metal ion Y, and $m$ represents an integer from 1 to 6 or more. Thus, one can employ the metal salt of a bromo or iodothiophenol, thionaphthol, -phenylthiophenol, -thiocresol, -poly(phenylene)-thiophenol, as well as their alkyl and aryl nuclear substituted derivatives. Further, one can employ dimers, trimers, and higher polysulfides of the aforegoing salts.

Suitable solvents for use in the solution polymerization technique include pyridine, quinoline, lutidine and the like.

One manner of preparing the monomers employed in accordance with the present invention is by reacting a para- or meta-bromo or iodoaromatic sulfonyl chloride, such as for example, bromobenzenesulfonyl chloride, with zinc or other reducing metal or iodobenzene sulfonyl chloride and hydrochloric acid, then reacting the halothiophenol there obtained with sodium hydride in anhydrous ethyl ether. The product of this reaction, upon drying, is suitable for use as the starting material in the present invention.

It is to be understood that in place of sodium hydride to prepare the phenate one can also employ the appropriate hydride, oxide or hydroxide of an alkali metal, an alkaline earth metal or a transition metal of Group IB, the Periodic Table, particularly silver and copper; although gold is operative, economics rules it out. Exemplary of the alkaline earth metal oxides which can be employed are beryllium oxide, magnesium oxide, calcium oxide, strontium oxide, and thorium oxide. Exemplary of the alkali metal hydrides which can be employed are lithium hydride, sodium hydride, potassium hydride, rubidium hydride, and cesium hydride.

The following examples are illustrative of the present invention but are not to be construed as limiting.

*Example 1*

4.68 grams (0.022 mole) of sodium p-bromothiophenoxide (95–97.5 percent purity) was placed in a 30 ml. heavy-walled ampoule under an inert atmosphere. In certain instances a solvent was also added to obtain data relative to solution polymerization. The ampoule was fitted with a stopcock, removed from the dry box and sealed with a torch. The sealed ampoule was placed in a stainless steel container which, in turn, was positioned in an aluminum block containing a strip heater and temperature regulator. This entire assembly was attached to a rocking mechanism. The ampoule was heated to 250° C. and maintained thereat with continuous rocking for various periods of time. Thereafter the ampoule was cooled to room temperature, then in liquid nitrogen, opened and the contents extracted with water. The aqueous extract was titrated for bromide ion. The residue from the water extraction was extracted with boiling toluene, and the residue from the toluene extraction was dissolved in boiling diphenyl ether. This diphenyl ether solution was slowly added dropwise into methanol with vigorous stirring. The precipitated polymer which formed was filtered off, washed with ether and dried under a vacuum at 60° C. The temperature of reaction, the presence or absence of solvent and the reaction time are recorded below along with the yield, analysis and softening point, where determined, of the polymer produced in the manner aforedescribed.

we used pyridine as the solvent to give approximately a mole/liter concentration. After sealing the glass ampoule, it was heated for the desired time with or without agitation. After the reaction was completed, the ampoule was cooled and opened. Then the product was extracted with water, dissolved in boiling diphenyl ether, precipitated in methanol, filtered and dried. The follow-

TABLE I

| Reaction Conditions ||| Conversion,[a] Percent | Polymeric Products, D.P.E. Soluble [b] ||||
|---|---|---|---|---|---|---|---|
| Time, Hrs. | Temp., °C. | Solvent | | Yield, Percent | Percent Br | Percent S | Softening Point, °C. |
| 139 | 285 | None | 93.5 | 70.6 | 1.25 | 28.3 | 280 |
| 24 | 305 | | | | | | |
| 72 | 280 | None | 95.4 | 76 | 1.6 | 27.9 | 280 |
| 72 | 280 | do | 96.5 | 78 | 2.0 | 27.1 | 280 |
| 72 | 295 | do | 92.6 | 61 | 1.1 | 29.0 | 250 |
| 72 | 295 | None [c] | 89.1 | 60 | 1.85 | 29.4 | (e) |
| 72 | 280 | do.[c] | 95.4 | 82 | 1.6 | 27.9 | 280 |
| 72 | 280 | None | 96.5 | 84 | 2.0 | 27.1 | 280 |
| 36 | 250 | do | 79.2 | (e) | (e) | (e) | (e) |
| 140 | 250 | do | 93.0 | 88 | (e) | (e) | (e) |
| 24 | 280 | Quinoline | 91.3 | (e) | (e) | (e) | (e) |
| 36 | 250 | Pyridine | 100 | (e) | 0.69 | 29.2 | 265 |
| 24 | 250 | do | 100 | (e) | 0.58 | 29.0 | |
| 12 | 250 | do | 98.4 | (e) | 0.67 | 29.4 | 265 |
| 6 | 250 | do | 100 | (e) | 1.50 | 29.1 | 260 |
| 3 | 250 | do | 97.6 | (e) | 3.75 | 27.1 | 240 |
| 2 | 250 | do | 97.8 | (e) | 6.00 | 28.9 | 240 |
| 1 | 250 | do | 72.0 | (e) | 13.2 | 31.3 | 160-200 |

[a] Based on bromide ion formed.
[b] Soluble in diphenyl ether at the boiling point, insoluble in methanol.
[c] Stainless steel ball bearings were included with the reactants in the ampoule.
[e] Not determined as yet.

Example 2

0.2562 gram (0.00131 mole) of lithium salt of p-bromothiophenol and 4.0 ml. of pyridine were placed in a 30 ml. heavy walled glass ampoule. This was carried out inside a dry box which contained an inert atmosphere of argon. The ampoule was flushed with argon and sealed off with a pinch clamp and tubing. The contents of the ampoule were frozen and the glass ampoule sealed with an oxygen-gas flame.

The ampoule was placed in a metal case, then in a preheated rocker at 250° C. for 30 minutes (½ hr.). Analysis of the reaction mixture indicated 1.13 meq. of bromine ion present, which equals 86 percent conversion to polymer. The polymer isolated had a melting point of 243–248° C.

Example 3

2.1627 grams (0.00954 mole) of potassium salt of p-bromothiophenol and 10 ml. of distilled pyridine were placed in a 30 ml. heavy walled ampoule. The ampoule was flushed with argon, sealed and placed in a preheated rocker at 250° C. The reaction was carried out for 8½ hours then stopped. Analysis showed 8.7 meq. of bromine ion present, 91.2 percent conversion. The polymer 1.0261 grams (99.0 percent) was isolated which had a melting point of 262–269° C., contained 2.2 percent bromine which is equivalent to a molecular weight of ~3600.

Example 4

1.4508 grams (0.00564 mole) sodium salt of p-iodothiophenol and 10 ml. pyridine were placed in a 30 ml. heavy walled ampoule. After flushing with argon, sealing and polymerizing at 250° C. for 6 hours, 5.22 meq. of iodide ion was found indicating a 92.6 percent conversion. The polymer had a melting point of 225–240° C.

Example 5

The copper salt of p-bromothiophenol was placed in a 30 ml. heavy walled ampoule under an inert atmosphere. The polymerization was carried out in the bulk or with a material which acted as a solvent. In most cases, ing table lists a summary of the results obtained employing the indicated conditions:

TABLE II

| Reaction Conditions ||| Polymeric Product [a] |||
|---|---|---|---|---|---|
| Time, Hrs. | Temp., °C. | Solvent | Yield [a] | M.P. Range, °C.[b] | Percent Br (Polymer) |
| 72 | 200 | None | 82 | 279–282 | (A) |
| 120 | 200 | do | 91.6 | 283–285 | (A) |
| 72 | 250 | do | 75.2 | 274–281 | (A) |
| 16 | 200 | Pyridine | 96.0 | 278 | 0.68 |
| 72 | 200 | do | 95.5 | 274 | 0.13 |
| 1 | 250 | do | 87.4 | 262–265 | (A) |
| 16 | 250 | do | 88.0 | 283–287 | 0.15 |
| 32 | 250 | do | 91.0 | 277–283 | (A) |

[a] diphenyl ether soluble-methanol insoluble—all conversions are 100% based on bromide ion formed.
[b] Or softening point.
[A] Not determined.

We claim:
1. A process which comprises reacting by heating a metal salt of a halothiophenol having the formula

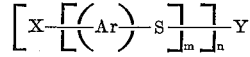

wherein X represents a halogen atom having an atomic number from 35 to 53 in a position other than ortho to the sulfur molecule, Ar represents an aromatic hydrocarbon radical of the benzene series, Y represents a metal ion selected from the group consisting of alkali metal, alkaline earth metal, and the transition metals copper, gold and silver, $n$ represents an integer equal to the valence of metal ion Y, $m$ represents an integer from 1 to about 6 and recovering a polyarylene sulfide having a molecular weight above that of the monomer employed.

2. A process which comprises reacting by heating initially at a temperature of from about 200° to about 300° C. and thereafter at from 200° C. to about 310° C. sodium p-bromothiophenate and recovering a polyarylene sulfide having a molecular weight above that of the sodium p-bromothiophenate.

3. The process of claim 2 wherein said sodium p-bromothiophenol is reacted by heating at about 200° C. to 300°

C. for 24 to 72 hours and then heated at about 290° to 310° C. for 24 to 72 hours.

4. The process of claim 2 wherein said reaction is conducted in the presence of a solvent for the monomer which is inert under the conditions of reaction.

5. A process which comprises heating the copper salt of p-bromothiophenol and recovering a polyarylene sulfide having a molecular weight above that of the copper salt of p-bromothiophenol.

6. A process which comprises heating lithium salt of p-bromothiophenol and recovering a polyarylene sulfide having a molecular weight above that of the lithium salt of p-bromothiophenol.

7. A process which comprises heating potassium salt of p-bromothiophenol and recovering a polyarylene sulfide having a molecular weight above that of the potassium salt of p-bromothiophenol.

8. A process which comprises heating sodium salt of p-iodothiophenol and recovering a polyarylene sulfide having a molecular weight above that of the sodium salt of p-iodothiophenol.

9. The process of claim 5 wherein said reaction is heated to 200° C. for from 1 to 120 hours.

10. The process of claim 9 wherein said reaction is carried out in the presence of pyridine.

References Cited by the Examiner

Lenz et al., J. Polymer Science, vol. 41, pp. 333–358, December 1959 (pp. 351–355 relied on).

Schnildknecht, Polymer Processes, vol. X, pp. 475–477, Interscience Inc., N.Y., 1956.

Staffin, J. Am. Chem. Soc., vol. 82, pp. 3632–4, July 20, 1960.

WILLIAM H. SHORT, *Primary Examiner.*

J. C. MARTIN, *Assistant Examiner.*